United States Patent Office 3,304,268
Patented Feb. 14, 1967

3,304,268
METHOD OF PREPARING A SUPPORTED COPPER OXIDE CATALYST COMPOSITION
George R. Lester, Mount Prospect, and Cecelia J. Adams, Chicago, Ill., assignors to Universal Oil Products Company, Des Plaines, Ill., a corporation of Delaware
No Drawing. Filed Sept. 20, 1965, Ser. No. 488,815
11 Claims. (Cl. 252—475)

This application is a continuation-in-part of a copending application Serial No. 243,985, filed December 12, 1962, now abandoned.

This invention relates to a novel method of preparing a catalyst composite, said catalyst composite being uniquely adapted to dehydrohalogenation of halohydrocarbons and recovery of elemental halogen.

Olefinic hydrocarbons are prepared from more saturated hydrocarbons via halogenation of said more saturated hydrocarbon followed by dehydrohalogenation of the resulting halohydrocarbon. Halogenation is usually by direct halogenation with elemental halogen and dehydrohalogenation is usually effected by heating the resulting halohydrocarbon at decomposition temperature forming a dehydrohalogenation reaction mixture comprising the olefinic hydrocarbon product and hydrogen halide. Olefinic hydrocarbons can be economically prepared in the aforesaid manner provided that the hydrogen halide can be efficiently separated from the hydrohalogenation reaction mixture, and further provided that substantially all of the halogen can be recovered from said hydrogen halide for use in the first-mentioned halogenation step.

It has now been found that a catalyst composite comprising copper oxide and certain of the basic metal oxides is particularly well adapted to dehydrohalogenation of halohydrocarbons, said catalyst composite having unusual capacity for retaining hydrogen halides at dehydrohalogenation conditions and thereafter effecting oxidation of the same to permit recovery of substantially all of the halogen therefrom, optimum recovery being effected when said catalyst composite is prepared in accordance with the method herein disclosed.

It is therefore an object of this invention to present a novel method of preparing a catalyst uniquely adapted to dehydrohalogenation of halohydrocarbons and recovery of elemental halogen.

This invention relates to the preparation of a dehydrohalogenation-halide oxidation catalyst comprising an oxide of a metal selected from the group consisting of magnesium, calcium, and zinc, composited with from about 0.1 wt. percent to about 15 wt. percent copper as copper oxide. The catalyst may further comprise a relatively inert refractory metal oxide, such as zirconia, to improve the attrition resistant characteristics of the catalyst composite.

In one of its broad aspects the present invention embodies a method of preparing said dehydrohalogenation-halide oxidation catalyst, which method comprises contacting an oxide of a metal selected from the group consisting of magnesium, calcium, and zinc, with a Group I and II metal cuprihydroxcarboxylate in aqueous solution, the concentration of said cuprihydroxycarboxylate in said solution being such that the final catalyst composite has the hereinafter recited composition, sorbing said cuprihydroxycarboxylate on said oxide, drying and calcining the resulting composite and forming a final catalyst composite comprising an oxide of a metal selected from the group consisting of magnesium, calcium, and zinc, and from about 0.1 wt. percent to about 15 wt. percent copper as copper oxide.

Another embodiment of the present invention relates to a method of preparing a dehydrohalogenation-halide oxidation catalyst which comprises contacting an oxide of magnesium with a Group I metal cuprihydroxycarboxylate in aqueous solution, the concentration of said cuprihydroxycarboxylate in said solution being such that the final catalyst composite has the hereinafter recited composition, sorbing said cuprihydroxycarboxylate on said oxide, drying and calcining the resulting composite and forming a final catalyst composite comprising an oxide of magnesium and from about 0.1 wt. percent to about 15 wt. percent copper as copper oxide.

Still another embodiment of this invention is in a method of preparing a dehydrohalogenation-halide oxidation catalyst which comprises contacting an oxide of calcium with a Group I metal cuprihydroxycarboxylate in aqueous solution, the concentration of said cuprihydroxycarboxylate in said solution being such that the final catalyst composite has the hereinafter recited composition, sorbing said cuprihydroxycarboxylate on said oxide, drying and calcining the resulting composite and forming a final catalyst composite comprising an oxide of calcium and from about 0.1 wt. percent to about 15 wt. percent copper as copper oxide.

Yet another embodiment relates to a method of preparing a dehydrohalogenation-halide oxidation catalyst which comprises contacting an oxide of zinc with a Group I metal cuprihydroxycarboxylate in aqueous solution, the concentration of said cuprihydroxycarboxylate in said solution being such that the final catalyst composite has the hereinafter recited composition, sorbing said cuprihydroxycarboxylate on said oxide, drying and calcining the resulting composite and forming a final catalyst composite comprising an oxide of zinc and from about 0.1 wt. percent to about 15 wt. percent copper as copper oxide.

Other objects and embodiments of this invention will become apparent in the following detailed specification.

In accordance with the method of this invention for preparing a dehydrohalogenation-halide oxidation catalyst, an oxide of a metal selected from the group consisting of magnesium, calcium, and zinc, is first contacted with a Group I and II metal cuprihydroxycarboxylate in aqueous solution. A Group I and II metal relates to the metals included in Group I and Group II of the Periodic Table as presented on pp. 400–401 of the 39th edition (1957–58) of the "Handbook of Chemistry and Physics," more particularly, the alkali metals and alkaline earth metals. Accordingly, a Group I and II metal includes lithium, sodium, potassium, rubidium, cesium, beryllium, magnesium, calcium, strontium, barium, etc.

In one of the preferred embodiments of this invention the Group I and II metal cuprihydroxycarboxylate is sodium cupritartrate which may be represented by the structural formula:

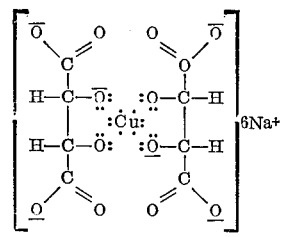

As will become apparent with reference to the structural formula set out above, the Group I and II metal cuprihydroxycarboxylates, utilized in accordance with the present invention, comprise a Group I and II metal hydroxycarboxylate in complex relationship with cupric ion. The Group I and II metal hydroxycarboxylate can be an aliphatic, alicyclic, or an aromatic hydroxycarboxylate, including the various isomeric forms of the Group I and II metal glycolates, lactates, hydroxybutyrates, malates, tartrates, citrates, mandelates, salicylates, tropates, hydroxycyclopentanecarboxylates, hydroxycyclohexanecarboxylates, etc., and higher homologs thereof containing up to about 15 carbon atoms, from about 1 to about 4 hydroxy substituents, and from 1 to about 4 carboxylate groups. The Group I and II metal cuprihydroxycarboxylates of this invention thus include sodium cupriglycolates, sodium cuprilactate, sodium cupri-alpha-hydroxybutyrate, sodium cupri-beta-hydroxybutyrate, sodium cuprimalate, sodium cupritartrate, sodium cupricitrate, sodium cuprimandelate, sodium cuprisalicylate, sodium cupritroprate, sodium cupri-2-hydroxycyclopentanecarboxylate, sodium cupri-2-hydroxycyclohexanecarboxylate, etc., and also the corresponding lithium, potassium, rubidium, cesium, beryllium, magnesium, calcium, strontium, and barium cuprilactates, cuprihydroxybutyrates, cuprimalates, cupritartrates, cupricitrates, cuprimandelates, cuprisalicylates, cupritropates, cuprihydroxycyclopentanecarboxylates, cuprihydroxycyclohexanecarboxylates, etc., as well as the higher homologs above defined.

The Group I and II metal cuprihydroxycarboxylates may be prepared by conventional methods known to those skilled in the art. One method comprises reacting stoichiometric amounts of an inorganic cupric salt, such as cupric nitrate, cupric sulfate, etc., and a hydroxycarboxylate, usually a sodium or potassium hydroxycarboxylate. The resulting cupric hydroxycarboxylate is recovered and reacted with a Group I and II metal base to form the desired Group I and II metal cuprihydroxycarboxylate. For example, sodium cupritartrate is prepared by reacting stoichiometric amounts of cupric nitrate and sodium tartrate in aqueous solution. The resulting cupric tartrate precipitate is recovered, water washed, and thereafter prepared in aqueous solution with sodium hydroxide to form the desired sodium cupritartrate.

The Group and II metal cuprihydroxycarboxylate can be composited with the aforementioned oxide of a metal selected from the group consisting of magnesium, calcium, and zinc, in any conventional or otherwise convenient manner. However, ammoniacal solutions are to be avoided. The surface area of the catalyst composite, and hence the capacity to retain hydrogen halides as herein contemplated, is substantially reduced by the leaching tendency of ammonia. One suitable method comprises suspending, soaking or otherwise immersing the magnesium oxide, calcium oxide, or zinc oxide in an aqueous solution of the selected Group I and II metal cuprihydroxycarboxylate for a suitable period of time during which the excess water is evaporated therefrom, or after which the excess solution is decanted therefrom. The foregoing procedure may be repeated one or more times, with or without intermediate drying, to achieve the desired catalyst composite. In any case, the concentration of said cuprihydroxycarboxylate should be such as to insure a final catalyst composite containing from about 0.1 wt. percent to about 15 wt. percent copper calculated as copper oxide, and preferably from about 1.0 wt. percent to about 10 wt. percent.

Regardless of the method of compositing the Group I and II metal cuprihydroxycarboxylate with the metal oxide, the resulting composite is dried, usually at a temperature of from about 95° C. to about 225° C. for a period of about 30 minutes to about 5 hours, prior to calcination. The composite is subsequently calcined at a temperature of at least 400° C., generally at a temperature of from about 400° C. to about 800° C., and preferably at a temperature of from about 500° C. to about 700° C. Calcination may be effected in any suitable atmosphere. Usually the calcination is effected in the presence of air or other oxidizing media, although in some cases calcination may be effected in an inert atmosphere such as nitrogen. The period of calcination will vary with the particular composite and with the temperature employed. Generally, calcination is effected at from about 30 minutes to about 10 hours and preferably from about 30 minutes at a relatively high temperature to about 8 hours at a relatively low temperature. The calcined catalyst may be water washed and dried to remove remaining traces of sodium or other Group I metal which may be present thus preventing subsequent formation of difficultly oxidizable Group I metal halides during the dehydrohalogenation process.

The catalyst composite of this invention is particularly useful with respect to dehydrobromination of bromohydrocarbons and recovery of elemental bromine. However, the catalyst may also be utilized, although not necessarily with the same or equivalent results, for dehydrochlorination of chlorohydrocarbons and recovery of elemental chlorine, dehydroiodination of iodohydrocarbons, and recovery of elemental iodine, and dehydrofluorination of fluorohydrocarbons, although the catalyst is substantially inactive with respect to the recovery of elemental fluorine.

One specific embodiment of this invention relates to a dehydrobromination-bromide oxidation catalyst comprising magnesium oxide composited with copper oxide prepared by contacting magnesium oxide and sodium cupritartrate in aqueous solution, the concentration of said sodium cupritartrate in said solution being such that the final catalyst composite has the hereinafter recited composition, sorbing said sodium cupritartrate on said magnesium oxide, drying and calcining the resulting composite and forming a final catalyst composite comprising magnesium oxide and from about 1.0 wt. percent to about 10 wt. percent copper as copper oxide.

Another specific embodiment relates to a method of preparing a dehydrobromination-hydrogen bromide oxidation catalyst which comprises contacting magnesium oxide with sodium cupricitrate in aqueous solution, the concentration of said sodium cupricitrate in said solution being such that the final catalyst composite has the hereinafter recited composition, sorbing said sodium cupricitrate on said oxide, drying and calcining the resulting composite and forming a final catalyst composite comprising magnesium oxide and from about 1.0 wt. percent to about 10 wt. percent copper as copper oxide.

Still another specific embodiment is in a method of preparing a deyhdrobromination-bromide oxidation catalyst which comprises contacting magnesium oxide and sodium cuprisalicylate in aqueous solution, the concentration of said sodium cuprisalicylate in said solution being such that the final catalyst composite has the hereinafter recited composition, sorbing said sodium cuprisalicylate on said oxide, drying and calcining the resulting composite and forming a final catalyst composite comprising magnesium oxide and from about 1.0 wt. percent to about 10 wt. percent copper as copper oxide.

And yet another specific embodiment of this invention relates to a method of preparing a dehydrobromination-bromide oxidation catalyst which comprises contacting calcium oxide with sodium cupritartrate in aqueous solution, the concentration of said sodium cupritartrate in said solution being such that the final catalyst composite has the hereinafter recited composition, sorbing said sodium cupritartrate on said oxide, drying and calcining the resulting composite and forming a final catalyst composite comprising calcium oxide at from about 1.0 wt. percent to about 10 wt. percent copper as copper oxide.

Another specific embodiment relates to a method of preparing a dehydrobromination-bromide oxidation catalyst which comprises contacting zinc oxide with sodium cupritartrate in aqueous solution, the concentration of said sodium cupritartrate in said solution being such that the final catalyst composite has the hereinafter recited composition, sorbing said sodium cupritartrate on said oxide, drying and calcining the resulting composite and forming a final catalyst comprising zinc oxide and from about 1.0 wt. percent to about 10 wt. percent copper as copper oxide.

The catalyst composite is preferably prepared in a particulate form which may be granular or shaped particles of definite size and shape. The more active catalyst composites appear to be those wherein the particulate form is effected by preparing the aforesaid metal oxide in the desired form prior to compositing the Group I and II metal cuprihydroxycarboxylate therewith. The metal oxide may be formed into particles of definite size and shape by commingling a powdered form thereof with suitable pelleting agent including hydrogenated vegetable oils, graphite, etc., and compressing the same into pellets. The metal oxide may also be formed into the desired shape by extrusion methods, etc., or utilized as granules of different size and shape.

The catalyst composite of this invention is conveniently utilized by charging the halohydrocarbon to be dehydrohalogenated to a reactor maintained at decomposition reaction conditions, said reactor being packed with said catalyst composite or containing a fixed bed of the same therein. Before the hydrogen halide capacity of the catalyst composite is exceeded, the halohydrocarbon flow is stopped and the retained hydrogen halide is oxidized to elemental halogen and water by passing air, or other oxygen-containing gas, over the catalyst composite at oxidation reaction conditions. The halohydrocarbons and air are periodically alternated to effect a continuous type of operation.

The metal oxides utilized in accordance with the method of this invention are limited to the oxides of magnesium, calcium and zinc. While the class of metal oxides herein disclosed may serve as a support for the copper oxide component of the catalyst composite, it should be understood that this is an incidental function. The disclosed metal oxides embody certain properties not found in metal oxide supports generally, which properties are essential to the objective of this invention, i.e., a catalyst composite uniquely adapted to dehydrohalogenation of halohydrocarbons and recovery of elemental halogen. The disclosed metal oxides are unique in that they retain unusually large amounts of hydrogen halide during the dehydrohalogenation process which are recoverable as elemental halogen upon oxidative regeneration of the catalyst composite, optimum recover being obtained when copper oxide is composited with the metal oxide by the method of this invention.

The catalyst composite of this invention presents a number of advantages. For example, hydrogen halide resulting from the dehydrohalogenation is readily and simply separated from the olefin product. Also, the hydrogen halide is bound in chemical and/or physical association with the catalyst composite in preference to a combination or reaction with the olefin product during the dehydrohalogenation. Furthermore, when prepared in the manner herein disclosed, optimum recovery of halogen in an elemental state is readily obtained. The novel method of preparation herein disclosed results in a considerably more active catalyst than conventional methods permit.

The following examples are presented to more clearly illustrate the method of preparation herein disclosed as well as the specific utility of the catalyst composite of this invention.

The catalyst composites described below were tested for hydrogen halide retention and subsequent oxidation of the retained halide by locating 50 cc. of the catalyst in a fixed bed of a vertical reactor and passing hydrogen bromide upflow over the catalyst. The catalyst composites prepared in accordance with the method of this invention increased 50–100% or more in weight due to retained hydrogen bromide. The temperature was thereafter raised to about 300° C. and air was passed upflow over the catalyst at a given gaseous hourly space velocity. The reactor effluent was passed through a scrubber containing 3 N sodium hydroxide solution. The scrubber contents were analyzed for bromine and total bromine at 10 minute intervals, and conversion was calculated from these results and the oxygen feed rate.

*Example I*

A conventional method of compositing copper oxide with a basic metal oxide such as magnesium oxide comprises impregnating said metal oxide with an ammoniacal solution of an inorganic copper salt, such as cupric nitrate, and drying and calcining the resulting composite. Accordingly, 4–14 mesh granular magnesium oxide was impregnated with an ammoniacal solution of cupric nitrate, dried in a rotary steam dryer, and calcined at 600° C. for two hours. The final catalyst composite consisted of 5 wt. percent copper, as copper oxide, and magnesium oxide.

Hydrogen bromide was passed upflow over the catalyst at a temperature of about 195–350° C. The catalyst retained about 33.2 g. of hydrogen bromide. Air was thereafter passed upflow over the catalyst at an initial temperature of about 310° C. and at a gaseous hourly space velocity of about 590. After 10 minutes only 16.8% of the retained hydrogen bromide was converted to elemental bromine.

*Example II*

In accordance with the method of this invention sodium cupritartrate was prepared in aqueous solution. About 120 ml. of this solution, containing 20 mg. of copper per ml., was poured over 57 g. of 4–14 mesh granular magnesium oxide and the resulting mixture evaporated to dryness in a rotary steam dryer. The resulting composite was calcined for 2 hours at 600° C. The final catalyst composite consisted of 6% copper, as copper oxide, and magnesium oxide.

Hydrogen bromide was passed upflow over the catalyst at a temperature of about 190–400° C. The catalyst retained about 23.2 g. of hydrogen bromide. Air was then passed upflow over the catalyst at an initial temperature of about 315° C. and at a gaseous hourly space velocity of about 590. After 10 minutes 94.8% of the retained hydrogen bromide was converted to elemental bromine.

*Example III*

A catalyst composite of copper oxide and magnesium oxide is also prepared in accordance with the method of this invention by reacting cupric nitrate and sodium citrate in aqueous solution. The cupric citrate precipitate is water washed and thereafter reacted with about a stoichiometric amount of sodium hydroxide in aqueous solution. About 180 ml. of this last-mentioned solution, containing approximately 3.6 g. of copper as sodium cupricitrate, is thereafter utilized as an impregnating solution for about 85 g. of granular magnesium oxide. The impregnating solution is evaporated to dryness in contact with the magnesium oxide in a rotary steam dryer and thereafter calcined for about 2 hours at 600° C. to yield an active catalyst composite consisting of about 4% copper as copper oxide and magnesium oxide.

*Example IV*

A catalyst composite of copper oxide and magnesium oxide is prepared by first reacting cupric nitrate and sodium-salicylate in aqueous solution. The cupric salicylate precipitate is water washed and thereafter reacted with a stoichiometric amount of sodium hydroxide in aqueous solution. About 85 g. of granular magnesium oxide is immersed in a portion of said solution containing about 3.6 g. of copper as sodium cuprisalicylate. The impregnating solution is evaporated to dryness in contact with the magnesium oxide in a rotary steam dryer and thereafter calcined for about 2 hours at 600° C. to yield an active catalyst composite consisting of about 4% copper as copper oxide and magnesium oxide.

We claim as our invention:

1. A method of preparing a catalyst which comprises contacting an oxide of a metal selected from a group consisting of magnesium, calcium, and zinc with an aqueous solution of a cuprihydroxycarboxylate of a metal selected from the group consisting of alkali metals and alkaline earth metals, the concentration of said cuprihydroxycarboxylate, in said solution being such that the final catalyst composite has the hereinafter recited composition, sorbing said cuprihydroxycarboxylate on said oxide, drying and calcining the resulting composite and forming a final catalyst composite comprising an oxide of a metal selected from the group consisting of magnesium, calcium, and zinc, and from about 0.1 wt. percent to about 15 wt. percent copper as copper oxide.

2. A method of preparing a catalyst which comprises contacting an oxide of a metal selected from the group consisting of magnesium, calcium, and zinc with an alkali metal cuprihydroxycarboxylate in aqueous solution, the concentration of said cuprihydroxycarboxylate in said solution being such that the final catalyst composite has the hereinafter recited composition, sorbing said cuprihydroxycarboxylate on said oxide, drying and calcining the resulting composite and forming a final catalyst composite comprising an oxide of a metal selected from the group consisting of magnesium, calcium, and zinc, and from about 0.1 wt. percent to about 15 wt. percent copper as copper oxide.

3. The process of claim 2 further characterized in that said cuprihydroxycarboxylate is a cupritartrate.

4. A method of preparing a catalyst which comprises contacting an oxide of magnesium with an aqueous solution of a cuprihydroxycarboxylate of a metal selected from the group consisting of alkali metals and alkaline earth metals, the concentration of said cuprihydroxycarboxylate in said solution being such that the final catalyst composite has the hereinafter recited composition, sorbing said cuprihydroxycarboxylate on said oxide, drying and calcining the resulting composite and forming a final catalyst composite comprising an oxide of magnesium and from about 0.1 wt. percent to about 15 wt. percent copper as copper oxide.

5. A method of preparing a catalyst which comprises contacting an oxide of magnesium with an alkali metal cuprihydroxycarboxylate in aqueous solution, the concentration of said cuprihydroxycarboxylate in said solution being such that the final catalyst composite has the hereinafter recited composition, sorbing said cuprihydroxycarboxylate on said oxide, drying and calcining the resulting composite and forming a final catalyst composite comprising an oxide of magnesium and from about 0.1 wt. percent to about 15 wt. percent copper as copper oxide.

6. The method of claim 5 further characterized in that said cuprihydroxycarboxylate is a cupritartrate.

7. A method of preparing a catalyst which comprises contacting magnesium oxide with sodium cupritartrate in aqueous solution, the concentration of said sodium cupritartrate in said solution being such that the final catalyst composite has the hereinafter recited composition, sorbing said sodium cupritartrate on said magnesium oxide, drying and calcining the resulting composite and forming a final catalyst composite comprising magnesium oxide and from about 1.0 wt. percent to about 10 wt. percent copper as copper oxide.

8. A method of preparing a catalyst which comprises contacting magnesium oxide with sodium cupricitrate in aqueous solution, the concentration of said sodium cupricitrate in said solution being such that the final catalyst composite has the hereinafter recited composition, sorbing said sodium cupricitrate on said oxide, drying and calcining the resulting composite and forming a final catalyst composite comprising magnesium oxide and from about 1.0 wt. percent to about 10 wt. percent copper as copper oxide.

9. A method of preparing a catalyst which comprises contacting calcium oxide with sodium cupritartrate in aqueous solution, the concentration of said sodium cupritartrate in said solution being such that the final catalyst composite has the hereinafter recited composition, sorbing said sodium cupritartrate on said oxide, drying and calcining the resulting composite and forming a final catalyst composite comprising magnesium oxide and from about wt. percent to about 10 wt. percent copper as copper oxide.

10. A method of preparing a catalyst which comprises contacting magnesium oxide with sodium cuprisalicylate in aqueous solution, the concentration of said sodium cuprisalicylate in said solution being such that the final catalyst composite has the hereinafter recited composition, sorbing said sodium cuprisalicylate on said oxide, drying and calcining the resulting composite and forming a final catalyst composite comprising magnesium oxide and from about 1.0 wt. percent to about 10 wt. percent copper as copper oxide.

11. A method of preparing a catalyst which comprises contacting zinc oxide with sodium cupritartrate in aqueous solution, the concentration of said sodium cupritartrate in said solution being such that the final catalyst composite has the hereinafter recited composition, sorbing said sodium cupritartrate on said oxide, drying and calcining the resulting composite and forming a final catalyst composite comprising zinc oxide and from about 1.0 wt. percent to about 10 wt. percent copper as copper oxide.

References Cited by the Examiner

UNITED STATES PATENTS

| | | | |
|---|---|---|---|
| 1,913,774 | 6/1933 | Seib | 252—475 X |
| 1,914,558 | 6/1933 | Craver | 252—467 X |
| 2,773,839 | 12/1956 | Stover et al. | 252—463 X |
| 2,927,088 | 3/1960 | Michalko et al. | 252—466 |
| 3,068,303 | 12/1962 | Pattison | 252—470 X |
| 3,133,029 | 5/1964 | Hoekstra | 252—466 |

OSCAR R. VERTIZ, *Primary Examiner.*

G. T. OZAKI, *Assistant Examiner.*